(12) United States Patent
Ukai

(10) Patent No.: US 6,472,651 B1
(45) Date of Patent: Oct. 29, 2002

(54) OPTICAL INFORMATION STORAGE DEVICE HAVING PHASE COMPENSATING MECHANISM AND POLARIZATION PLANE ROTATING MECHANISM

(75) Inventor: Hirataka Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/478,910

(22) Filed: Jan. 7, 2000

(30) Foreign Application Priority Data

Jun. 18, 1999 (JP) .......................................... 11-172599

(51) Int. Cl.[7] ................................................ G02B 7/04
(52) U.S. Cl. ...................................... 250/201.5; 250/225
(58) Field of Search ........................... 369/13.01, 13.32, 369/244, 13.29–13.31; 250/201.5, 201.2, 201.3, 201.4, 225

(56) References Cited

U.S. PATENT DOCUMENTS

| | | | |
|---|---|---|---|
| 5,668,786 A | * 9/1997 | Sasaki et al. | 369/13 |
| 5,784,347 A | * 7/1998 | Miyamoto et al. | 369/54 |
| 5,831,942 A | * 11/1998 | Morimoto et al. | 369/13 |
| 6,108,280 A | * 8/2000 | Morimoto | 369/13 |

FOREIGN PATENT DOCUMENTS

| | | | |
|---|---|---|---|
| JP | 1229445 | 9/1989 | |
| JP | 02285531 A | * 11/1990 | 369/244 |
| JP | 6230222 | 8/1994 | |
| JP | 8297883 | 11/1996 | |

* cited by examiner

Primary Examiner—Kevin Pyo
Assistant Examiner—Seung C Sohn
(74) Attorney, Agent, or Firm—Greer, Burns & Crain, Ltd.

(57) ABSTRACT

An optical information storage device including a first photodetector for detecting a regenerative signal from reflected light from an optical recording medium, a second photodetector for detecting a tracking error signal and a focusing error signal from the reflected light, and a beam splitter for separating the reflected light into a first beam directed toward the first photodetector and a second beam directed toward the second photodetector. The optical information storage device further includes a phase compensating mechanism provided between the beam splitter and the first photodetector for compensating for a phase difference of the first beam, a Wollaston prism provided between the phase compensating mechanism and the first photodetector for separating the first beam into two beams having orthogonal polarization planes, and a polarization plane rotating mechanism for rotating the polarization plane of the first beam incident on the Wollaston prism.

12 Claims, 16 Drawing Sheets

OPTICAL INFORMATION STORAGE DEVICE HAVING PHASE COMPENSATING MECHANISM AND POLARIZATION PLANE ROTATING MECHANISM

BACKGROUND OF THE INVENTION

1. Field of the Invention

The present invention relates generally to an optical information storage device, and more particularly to an optical information recording/reproducing device for recording/reproducing an optical signal on/from a recording medium.

2. Description of the Related Art

An optical disk has received attention as a memory medium that becomes a core in the recent rapid development of multimedia, and it is usually accommodated in a cartridge case to be provided as an optical disk cartridge for practical use. The optical disk cartridge is loaded into an optical disk drive to perform reading/writing of data (information) from/to the optical disk by means of an optical pickup (optical head).

A recent optical disk drive intended to realize size reduction is composed of a fixed optical assembly including a laser diode, a polarization beam splitter for reflecting and transmitting a laser beam, and a photodetector for receiving reflected light from an optical disk, and a movable optical assembly including a carriage and an optical head having an objective lens and a beam raising mirror mounted on the carriage. The carriage is movable in the radial direction of the optical disk along a pair of rails by means of a voice coil motor.

A write-power laser beam emitted from the laser diode of the fixed optical assembly is first collimated by a collimator lens, next transmitted by the polarization beam splitter, next reflected by the beam raising mirror of the optical head, and finally focused on the optical disk by the objective lens, thereby writing data onto the optical disk. On the other hand, data reading is performed by directing a read-power laser beam onto the optical disk. Reflected light from the optical disk is first collimated by the objective lens, next reflected by the polarization beam splitter, and finally detected by the photodetector, thereby converting the detected optical signal into an electrical signal.

A plurality of grooves are formed on a substrate of the optical disk in a concentric or spiral fashion to guide a laser beam to be directed onto the substrate. A flat portion defined between any adjacent ones of the grooves is called a land. In a general optical disk in the prior art, either the lands or the grooves are used as recording tracks on which information is recorded. In a magneto-optical disk drive as a kind of optical disk drive, a read-power laser beam is directed on a magneto-optical disk, and reflected light from the magneto-optical disk enters beam separating means such as a Wollaston prism. The incident light is separated into a P-polarized light component and an S-polarized light component by the beam separating means. The P-polarized light component and the S-polarized light component are differentially detected by a two-division photodetector to thereby reproduce a magneto-optical signal. Thus, in the magneto-optical disk drive, it is necessary to differentially detect the P-polarized light component and the S-polarized light component of the reflected light and optimally reproduce the magneto-optical signal.

The reflected light from the magneto-optical disk entering the Wollaston prism is to maintain linear polarization. However, a phase difference occurs between the P-polarized light component and the S-polarized light component of the reflected light in an optical system including the beam raising mirror and the polarization beam splitter. Further, on the magneto-optical disk whose substrate is formed of polycarbonate, a phase difference due to birefringence is enhanced to cause undulation of a DC component of the regenerative signal.

To reduce the undulation of the DC component of the regenerative signal, a conventional optical head is configured so that a phase difference in the optical head is controlled to be reduced by suitably selecting phase differences in individual optical components of the optical head or by suitably combining the directions of the phase differences in the individual optical components. Accordingly, it is difficult to reduce the cost of each optical component because of the selection and control of the phase differences in the individual optical components. Further, a total phase difference in the optical system as a whole depends on the accuracies of a plurality of optical components, so that a variation in phase difference largely differs between individual magneto-optical disk drives, causing a reduction in yield.

Japanese Patent Laid-open No. 1-229445 has proposed inserting a phase plate in an optical path of the reflected light to compensate for a phase difference between the P-polarized light component and the S-polarized light component of the reflected light. However, while the phase difference differs between individual magneto-optical disk drives, this publication includes no description on means for correcting this phase difference differing between individual magneto-optical disk drives. Japanese Patent Laid-open No. 8-297883 has proposed using a Soleil-Babinet phase plate as the means for correcting this phase difference differing between individual magneto-optical disk drives. However, the use of such a phase plate invites an increase in size and cost of the disk drive. Japanese Patent Laid-open No. 1-230222 has proposed locating a phase compensator in an optical pickup to compensate for a phase difference. This method allows simple phase compensation.

In this method, phase compensation is performed by rotating the phase compensator. However, the rotation of the phase compensator causes a change in orientation of its crystal axes (optic axes), resulting in a deviation in polarization direction of reflected light incident on a Wollaston prism located downstream of the phase compensator, from an optimum direction. The Wollaston prism is located so that its crystal axes (optic axes) form 45° with respect to the polarization plane of the P-polarized light component or the S-polarized light component of the reflected light. If the polarization direction of the reflected light incident on the Wollaston prism is deviated by the rotation of the phase compensator, from the orientation of the Wollaston prism, i.e., 45°, there occurs an offset in DC component of the regenerative signal.

SUMMARY OF THE INVENTION

It is therefore an object of the present invention to provide an optical information storage device which can adjust the phase difference of the reflected light and the direction of the polarization plane in individual storage devices to reduce the undulation and offset of the DC component of a regenerative signal.

In accordance with an aspect of the present invention, there is provided an optical information storage device comprising an optical source; an optical head having an objective lens for focusing light from the optical source onto a recording surface of an optical recording medium; a first photodetector for detecting a regenerative signal from reflected light from the optical recording medium; a second photodetector for detecting a tracking error signal and a focusing error signal from the reflected light; a beam splitter for separating the reflected light into a first beam directed toward the first photodetector and a second beam directed toward the second photodetector; a phase compensating mechanism provided between the beam splitter and the first photodetector for compensating for a phase difference of the first beam; beam separating means provided between the phase compensating mechanism and the first photodetector for separating the first beam into two beams having different polarization planes; and polarization plane rotating means for rotating a polarization plane of the first beam incident on the beam separating means.

Preferably, the phase compensating mechanism comprises a phase plate and means for supporting the phase plate so that the phase plate is rotationally adjustable about an axis perpendicular to an optical path of the first beam. The phase plate has a thickness such that a phase difference larger than the sum of the maximum values of variations in phase difference in all optical components constituting an optical system through which the reflected light passes is given to the first beam when the angle of incidence of the first beam on the phase plate is 0°.

Preferably, the optical information storage device further comprises a condenser lens for focusing the first beam on the first photodetector, and the beam separating means comprises a Wollaston prism. The polarization plane rotating means comprises a rotatable lens holder for commonly accommodating the condenser lens and the Wollaston prism, and an optical base for mounting the lens holder so that the lens holder is rotationally adjustable about the optical axis thereof. In this case, the polarization plane rotating means comprises means for rotating the Wollaston prism fixedly mounted in the lens barrel.

Alternatively, the polarization plane rotating means comprises a half-wave plate; a cylindrical support for accommodating the half-wave plate; and means for holding the cylindrical support so that the cylindrical support is rotationally adjustable about the optical axis thereof. The phase compensating mechanism is adjusted so as to compensate for the phase difference of the first beam so that an undulation amount of a DC component of the regenerative signal is minimized, and the polarization plane rotating means is adjusted so as to rotate the polarization plane of the first beam so that an offset amount of the DC component of the regenerative signal is minimized.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
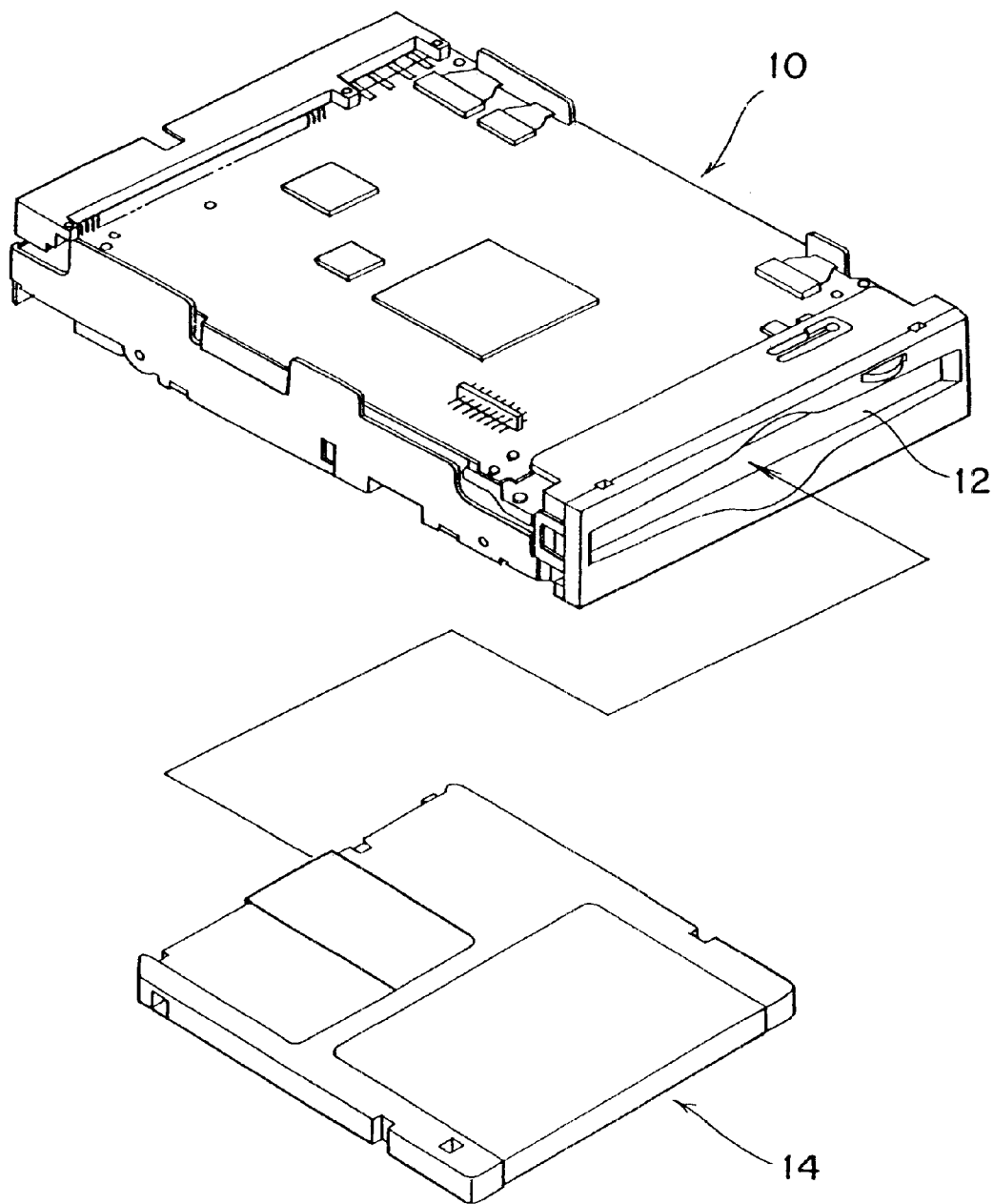
FIG. 1 is an upper perspective view of a magneto-optical disk drive including a phase compensating mechanism and a polarization plane rotating mechanism according to the present invention.
Figure 2:
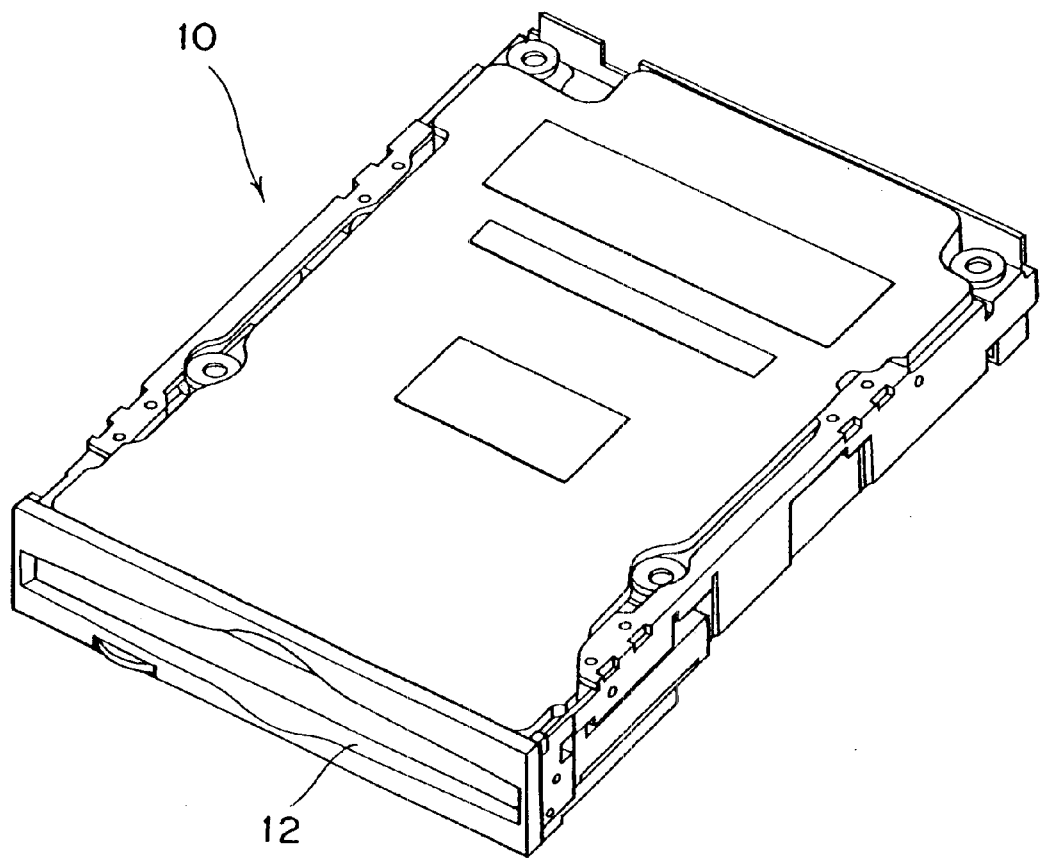
FIG. 2 is a lower perspective view of the magneto-optical disk drive.

Referring to FIG. 1, there is shown a perspective view of a magneto-optical disk drive 10 including a phase compensating mechanism and a polarization plane rotating mechanism according to the present invention, as viewed from the upper side. FIG. 2 is a perspective view of the magneto-optical disk drive 10 as viewed from the lower side. The magneto-optical disk drive 10 accepts a magneto-optical disk cartridge 14 having a cartridge case and a magneto-optical disk rotatably accommodated in the cartridge case, and performs reading/writing of information from/to the magneto-optical disk of the magneto-optical disk cartridge 14.

As will be hereinafter described in detail, the magneto-optical disk drive 10 includes a load/eject mechanism for the magneto-optical disk cartridge 14, a spindle motor for rotating the magneto-optical disk, a bias magnetic field generating mechanism, a positioner, an optical head, and a fixed optical unit. The magneto-optical disk drive 10 further has an insert opening 12 for accepting the magneto-optical disk cartridge 14.

Figure 3:
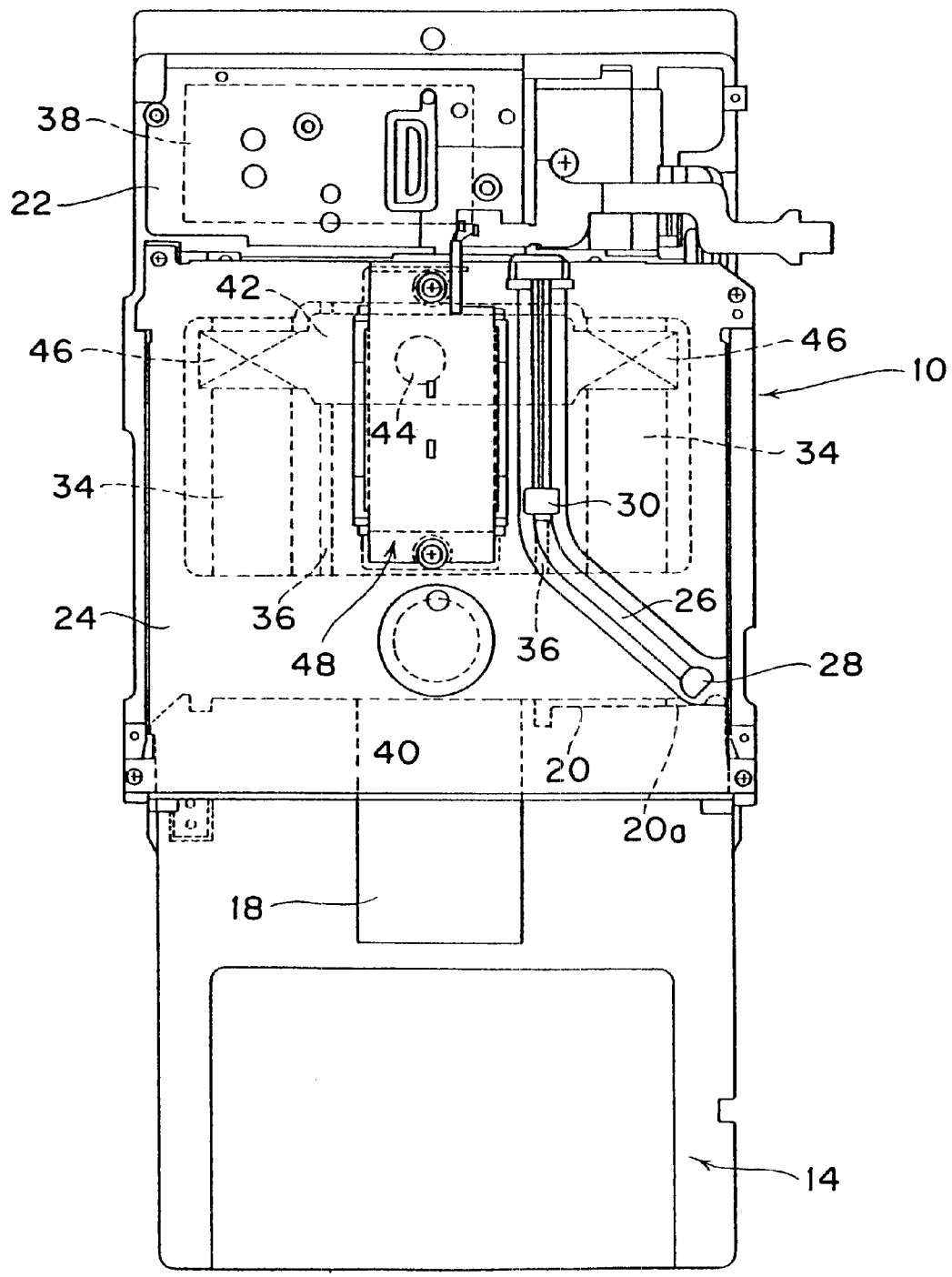
FIG. 3 is a plan view showing a condition where a magneto-optical disk cartridge is slightly inserted in the magneto-optical disk drive.

FIG. 3 is a plan view showing a condition where the magneto-optical disk cartridge 14 is slightly inserted in the magneto-optical disk drive 10 from the insert opening 12. Reference numeral 22 denotes a drive base of the magneto-optical disk drive 10. A cartridge holder 24 for holding the magneto-optical disk cartridge 14 inserted into the magneto-optical disk drive 10 is mounted on the drive base 22. The cartridge holder 24 is formed with a guide groove 26. The guide groove 26 is composed of a first portion obliquely extending from one end of the insert opening 12 laterally inward of the cartridge holder 24 and a second portion extending from an inward end of the first portion to the rear end of the cartridge holder 24 in parallel to the longitudinal direction of the magneto-optical disk drive 10.

A first slider 28 and a second slider 30 are slidably engaged with the guide groove 26. The second slider 30 is connected to the first slider 28 by a spring (not shown), so that when the first slider 28 is moved inward of the cartridge holder 24 along the guide groove 26, the second slider 30 is moved through this spring to the rear end of the cartridge holder 24 along the guide groove 26. When the magneto-optical disk cartridge 14 is inserted from the insert opening 12 into the magneto-optical disk drive 10, the first slider 28 comes into abutment against an end portion 20a of a shutter opening arm 20 mounted to a shutter 18 of the magneto-optical disk cartridge 14. During further insertion of the magneto-optical disk cartridge 14 into the magneto-optical disk drive 10, the first slider 28 is moved along the guide groove 26 inward of the cartridge holder 24 to push the shutter opening arm 20, thereby opening the shutter 18.

Further mounted on the drive base 22 are a pair of magnetic circuits 34, a pair of guide rails 36, a fixed optical unit 38 having a semiconductor laser and a photodetector, and a spindle motor 40. Reference numeral 42 denotes a carriage for carrying an optical head 44 having an objective lens. The carriage 42 is provided with a pair of coils 46 at opposite positions respectively corresponding to the pair of magnetic circuits 34. The magnetic circuits 34 and the coils 46 constitute a voice coil motor (VCM). When a current is passed through the coils 46, the carriage 42 is guided by the pair of guide rails 36 to move in the radial direction of a magneto-optical disk 16. Reference numeral 48 denotes a bias magnetic field generating mechanism mounted on the cartridge holder 24 so as to cover a range of movement of the optical head 44.

Figure 4:
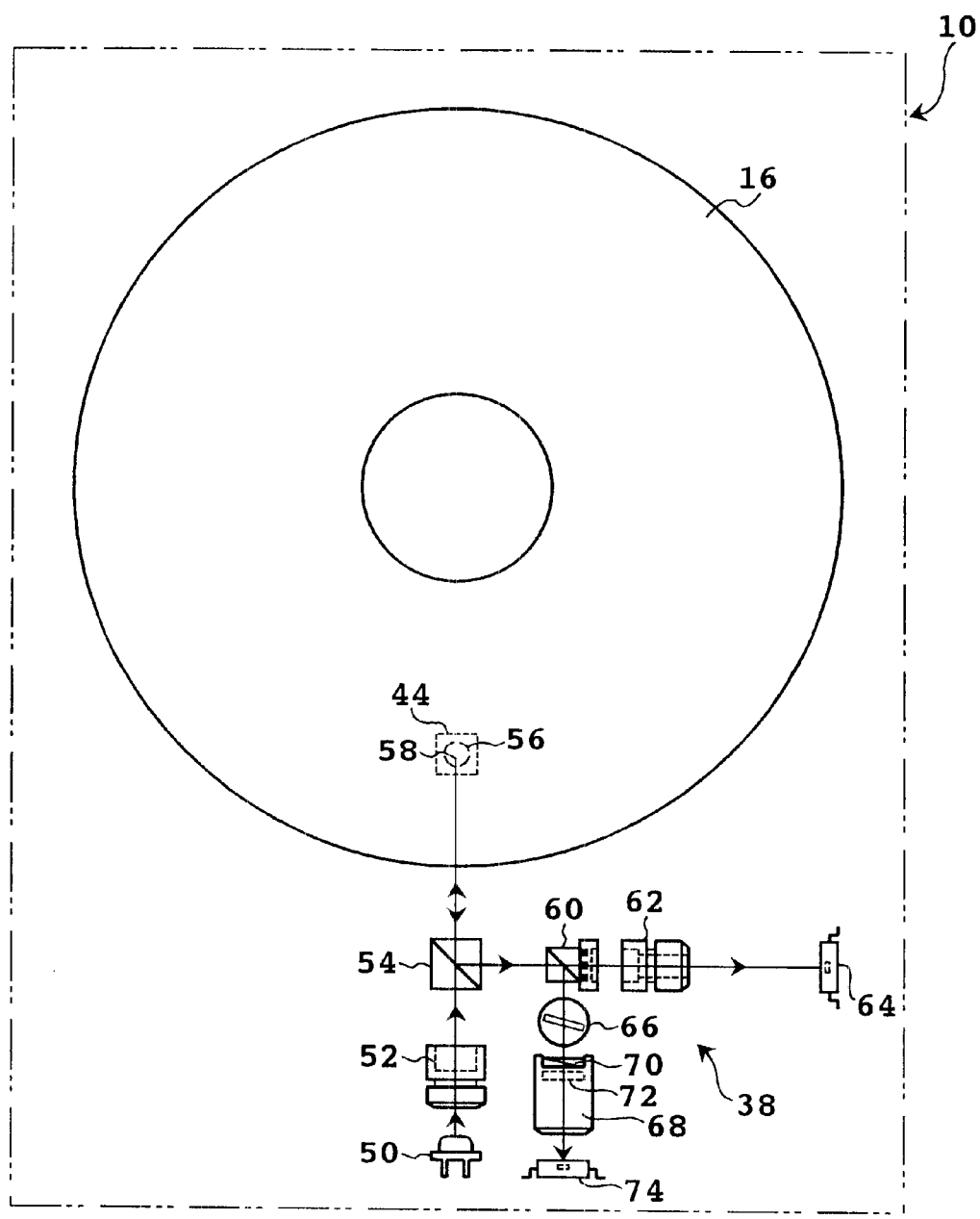
FIG. 4 is a plan view of an optical system in the magneto-optical disk drive.
Figure 5:
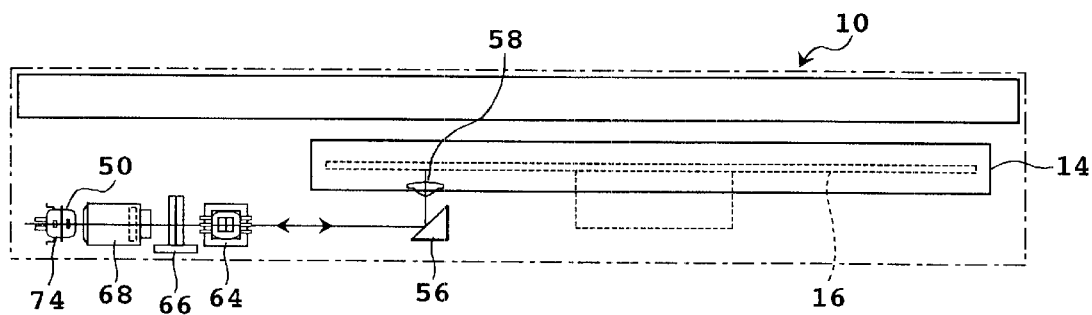
FIG. 5 is a right side view of FIG. 4.
Figure 6:
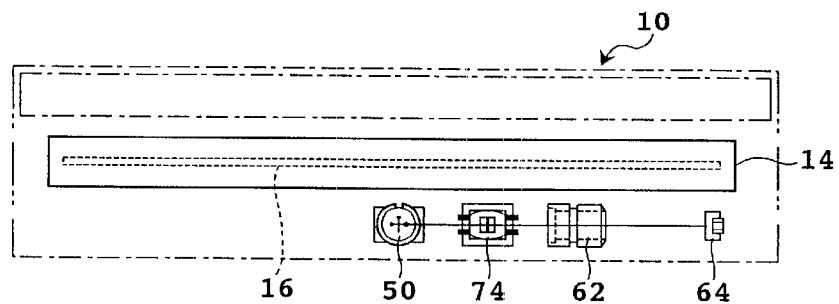
FIG. 6 is a front elevation of FIG. 4.

Referring to FIG. 4, there is shown a plan view of an optical system in the magneto-optical disk drive 10. FIG. 5 is a right side view of FIG. 4, and FIG. 6 is a front elevation of FIG. 4. The fixed optical unit 38 is mounted on an optical base fixed to the drive base 22. Alternatively, the fixed optical unit 38 may be directly mounted on the drive base 22 without using the optical base 39.

A laser beam mainly having a P-polarized light component emitted from a semiconductor laser 50 is converted into a parallel light beam by a collimator lens 52, and the parallel light beam enters a polarization beam splitter 54. The polarization beam splitter 54 has a transmitting characteristic and a reflecting characteristic as set in the following manner. For example, letting Tp and Ts denote the transmittances of a P-polarized light component and an S-polarized light component, respectively, and Rp and Rs denote the reflectances to a P-polarized light component and an S-polarized light component, respectively, the transmitting characteristic and the reflecting characteristic of the polarization beam splitter 54 are set to satisfy the relations of Tp: Rp=80:20 and Ts: Rs=2:98.

A laser beam transmitted by the polarization beam splitter 54 according to the transmitting characteristic thereof is reflected by a beam raising mirror 56 in the optical head 44, and then focused onto the magneto-optical disk 16 by an objective lens 58 in the optical head 44. In writing information onto the magneto-optical disk 16, a bias magnetic field having a fixed direction is applied to a laser directing position on the magneto-optical disk 16 by the bias magnetic field generating mechanism 48 (see FIG. 3) located opposite to the objective lens 58 with respect to the magneto-optical disk 16. Accordingly, a recording mark is formed on the magneto-optical disk 16 by the laser beam focused thereon.

In regenerating the information recorded on the magneto-optical disk 16, a laser beam having a power lower than that of the laser beam for recording is directed onto the magneto-optical disk 16, and the orientation of a polarization plane of reflected light from the recording mark on the magneto-optical disk 16 is detected. When reflecting on the disk surface, the laser beam as linearly polarized light mainly having a P-polarized light component rotates by a Kerr rotation angle of θk or −θk because of the magneto-optic Kerr effect. The direction of this rotation differs according to the orientation of magnetization of the magneto-optical disk 16.

The reflected light from the magneto-optical disk 16 is collimated by the objective lens 58, next reflected by the beam raising mirror 56, and next reflected by the polarization beam splitter 54 according to the reflecting characteristic thereof to enter a polarization beam splitter 60. The polarization beam splitter 60 has a transmitting characteristic and a reflecting characteristic as set in the following manner. For example, letting Tp and Ts denote the transmittances of a P-polarized light component and an S-polarized light component, respectively, and Rp and Rs denote the reflectances of a P-polarized light component and an S-polarized light component, respectively, the transmitting characteristic and the reflecting characteristic of the polarization beam splitter 60 are set to satisfy the relations of Tp: Rp=60:40 and Ts: Rs=2:98.

The reflected light having almost no S-polarized light component from the polarization beam splitter 54 is transmitted by the polarization beam splitter 60 to enter a lens 62. Then, the incident light is focused on a four-division photodetector 64 for a servo signal by the lens 62 to generate a tracking error signal and a focusing error signal. On the other hand, the beam having an S-polarized light component from the polarization beam splitter 54 is reflected by the polarization beam splitter 60 to enter a rotationally adjustable phase plate 66. The phase plate 66 is configured by laminating two quartz sheets. The phase plate 66 is preliminarily adjusted in its rotational angle with respect to the optical path of the reflected light from the polarization beam splitter 60 so as to compensate for a phase difference between the P-polarized light component and the S-polarized light component generated in the optical system for the reflected light as configured by the beam raising mirror 56 and the polarization beam splitters 54 and 60. Accordingly, the beam passed through the phase plate 66 becomes linearly polarized light having no phase difference.

The phase plate 66 has a thickness such that a phase difference larger than the sum of the maximum values of variations in phase difference in all the optical components of the optical system for the reflected light is given to the reflected light beam from the polarization beam splitter 60 when the angle of incidence of the beam on the phase plate 66 is 0°. By setting the thickness of the phase plate 66 as mentioned above, the phase difference of the beam passed through the phase plate 66 can be eliminated.

Figure 7:
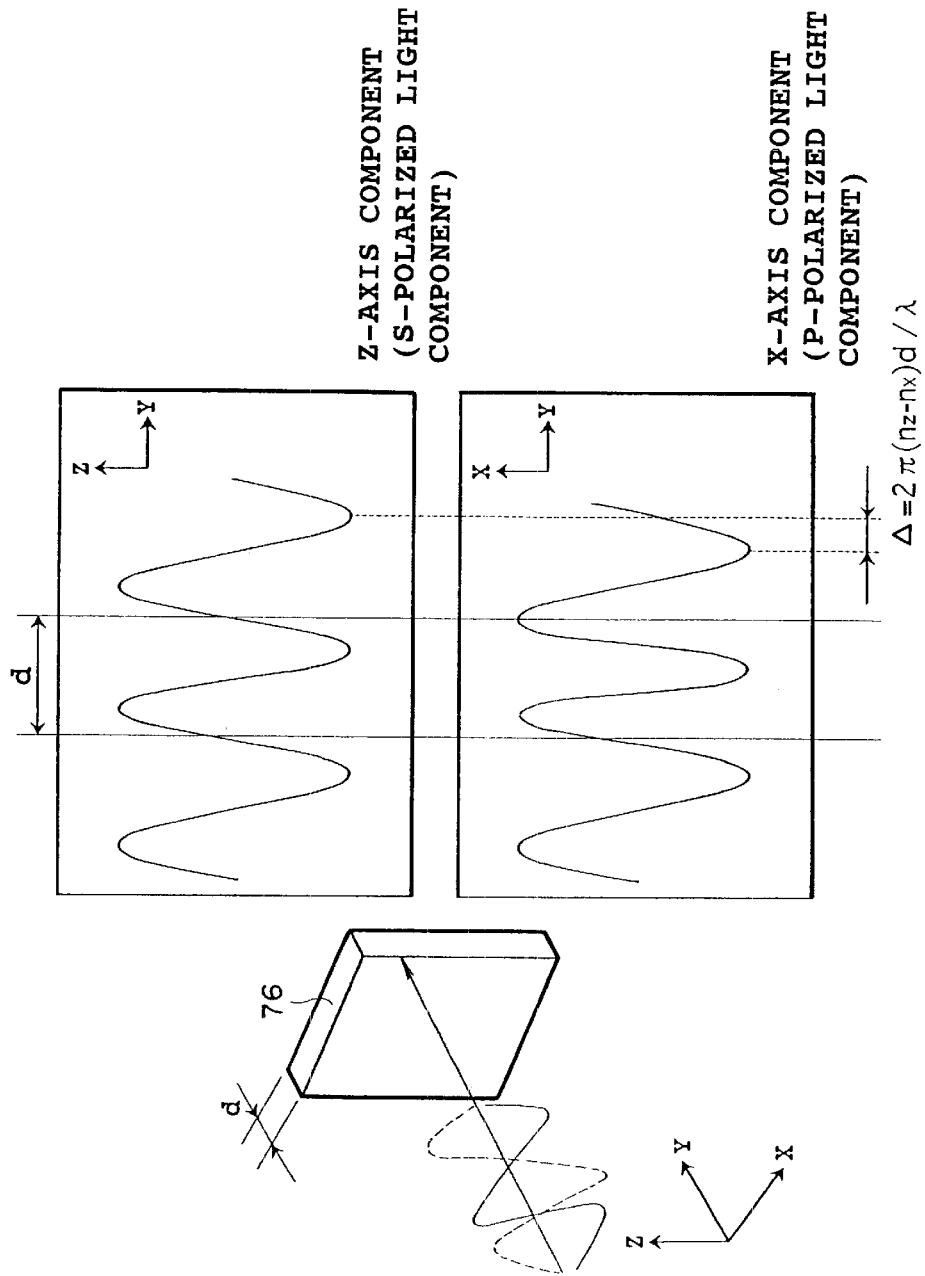
FIG. 7 is an illustration of the principle of phase compensation in the present invention.

FIG. 7 illustrates the principle of phase compensation in the present invention. When a laser beam is directed to a phase plate 76 such as a half-wave plate, a phase difference Δ is generated between a Z-axis component (S-polarized light component) of the laser beam and an X-axis component (P-polarized light component) of the laser beam. The phase difference Δ is a function of the thickness d of the phase plate 76 and the refractive indices $n_z$ and $n_x$ of the phase plate 76 in the Z-axis and X-axis directions, and it is expressed as follows:

$$\Delta=2\pi(n_z-n_x)d/\pi$$

By tilting the phase plate 76, the thickness d along the optical path of the laser beam in the phase plate 76 is changed, resulting in a change in the phase difference Δ. The preferred embodiment of the optical system shown in FIG. 4 employs this principle, so that the phase plate 66 is rotated about an axis perpendicular to the optical axis of the beam from the polarization beam splitter 60.

Figure 8:
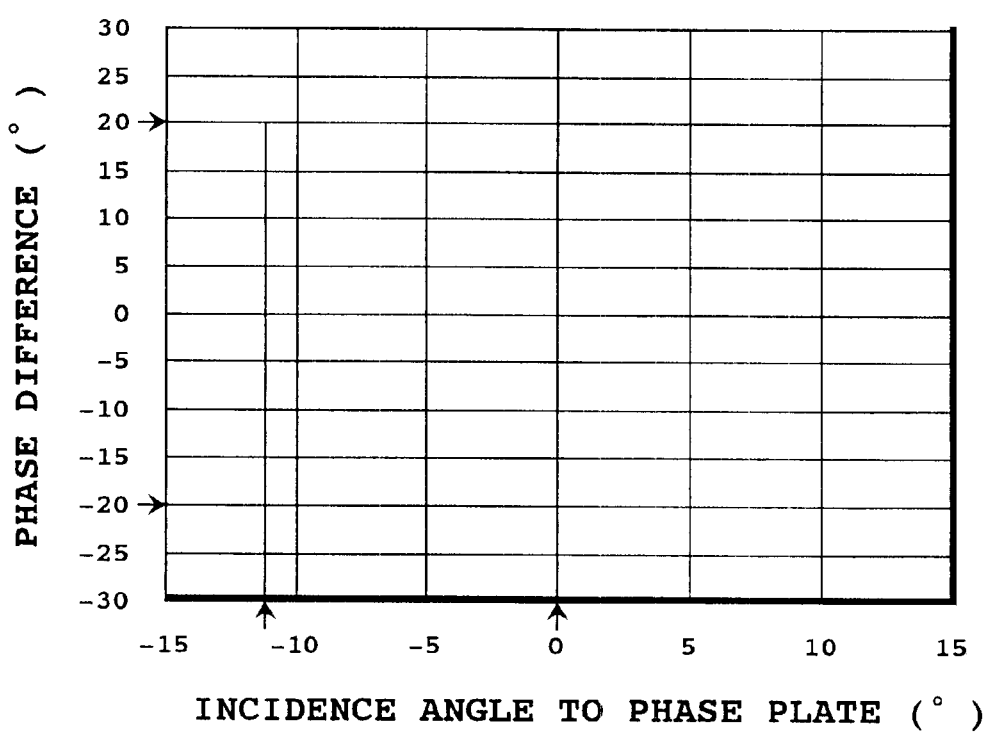
FIG. 8 is a graph showing the relation between an incidence angle to a phase plate and a phase difference.

FIG. 8 shows a result of calculation of the relation between an incidence angle θ to the phase plate and a phase difference Δ. In this preferred embodiment, the variations in phase difference generated in the optical system for the reflected light (including the beam raising mirror 56 and the polarization beam splitters 54 and 60) are set within ±20°. In the case of adopting quartz as the material of the phase plate 66, a phase difference of −20° can be obtained at an incidence angle of 0° to the phase plate 66, and a phase difference of +20° can be obtained at an incidence angle of 12° to the phase plate 66. In the case that the thickness of the phase plate 66 is set to 1 mm and the incidence angle of the beam on the phase plate 66 is ±12°, the shift amount of the beam passed through the phase plate 66 becomes about 0.1 mm.

Figure 9:
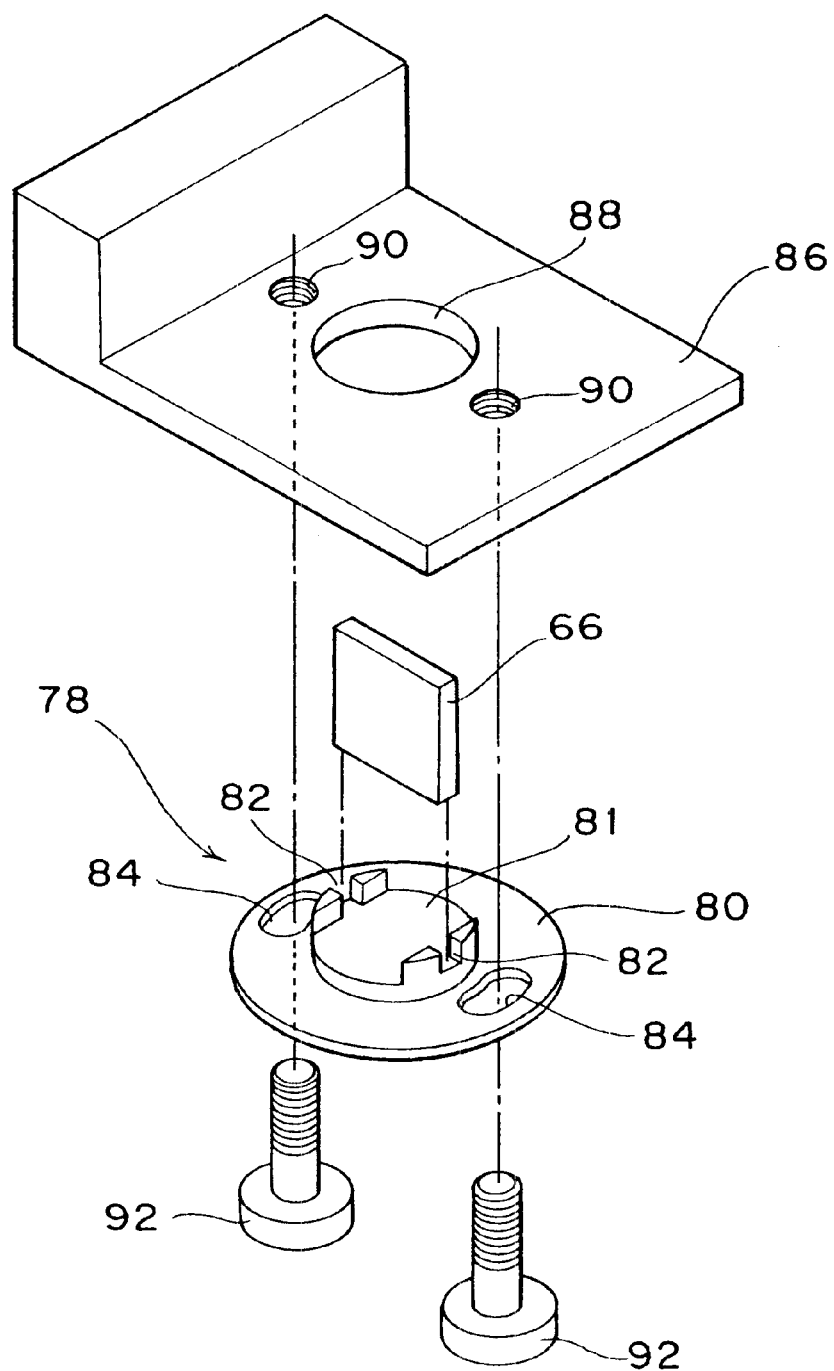
FIG. 9 is an exploded perspective view of a phase compensating mechanism in a preferred embodiment of the present invention.
Figure 10:
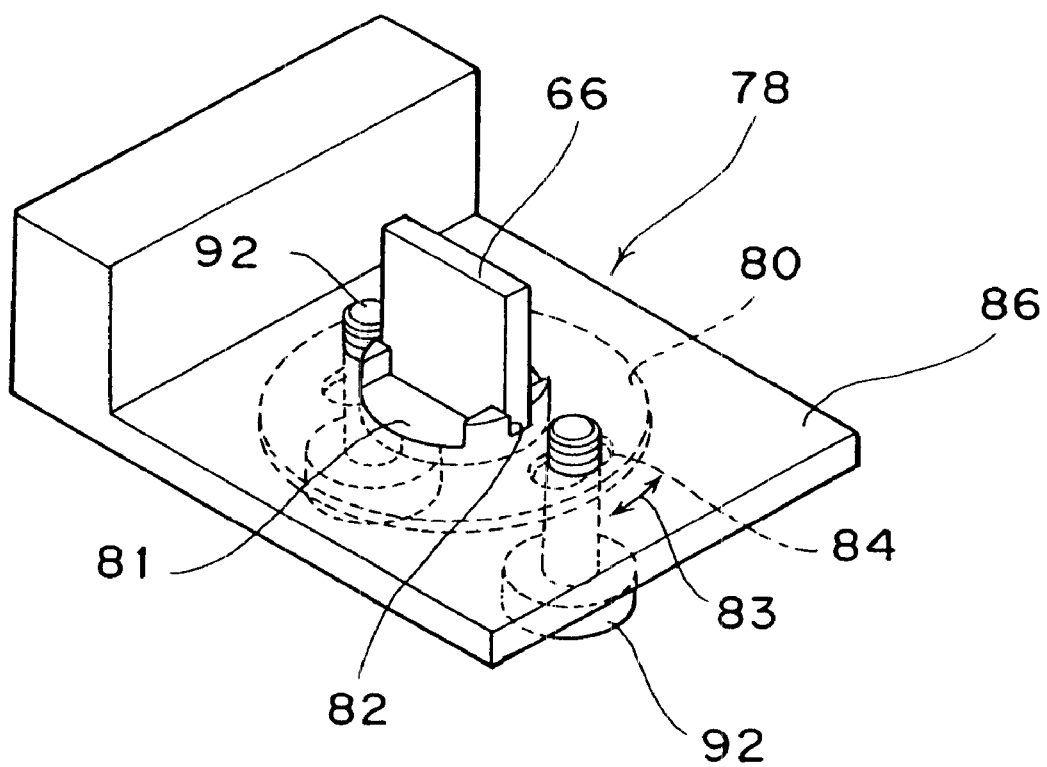
FIG. 10 is a perspective view of the phase compensating mechanism shown in FIG. 9.

FIG. 9 is an exploded perspective view of a phase compensating mechanism 78 in this preferred embodiment, and FIG. 10 is a perspective view of the phase compensating mechanism 78 in its assembled condition. The phase compensating mechanism 78 has a phase plate mounting member 80 and a base 86. The phase plate mounting member 80 has a central circular projecting portion 81 and a pair of elongated holes 84. The projecting portion 81 is formed with a pair of recesses 82. The base 86 has a circular through hole 88 and a pair of tapped holes 90. The phase plate 66 is fitted with the recesses 82 of the projecting portion 81, thereby mounting the phase plate 66 on the phase plate mounting member 80. The projecting portion 81 of the phase plate mounting member 80 is fitted with the through hole 88 of the base 86 on the lower side thereof. In this condition, two screws 92 are inserted through the elongated holes 84 of the mounting member 80 and threaded into the tapped holes 90 of the base 86, thereby rotationally adjustably mounting the phase plate 66 to the base 86.

The phase plate 66 is mounted on the phase plate mounting member 80 so that the optic axis of the phase plate 66 is parallel to the polarization direction of the P-polarized light component or the S-polarized light component. The projecting portion 81 of the phase plate mounting member 80 is snugly fitted with the through hole 88 of the base 86, so that the phase plate 66 can be guided by the through hole 88 of the base 86 and be rotationally adjusted in opposite directions depicted by a double-headed arrow 83 shown in FIG. 10 in a loosely engaged condition of the screws 92. After rotationally adjusting the phase plate 66, the screws 92 are tightly engaged into the tapped holes 90 of the base 86, thereby fixing the phase plate mounting member 80 to the base 86.

Referring again to FIG. 4, the beam passed through the phase plate 66 enters a Wollaston prism 70. As will be hereinafter described, the Wollaston prism 70 is mounted on a lens holder 68 accommodating a condenser lens 72. The Wollaston prism 70 is fixed after rotational adjustment about the optical axis so as to absorb magneto-optical Kerr rotation, cutting error from the orientation of the Wollaston prism 70 (45° with respect to the P-polarized light component or the S-polarized light component), and deviation of the polarization plane due to the phase plate 66.

Accordingly, the linearly polarized light beam passed through the phase plate 66 is separated by the Wollaston prism 70 into a P-polarized light component beam and an S-polarized light component beam rotated 45° with respect to the polarization direction of the incident beam, so that the separate beams emerging from the Wollaston prism 70 have no imbalance. The P-polarized light component beam and the S-polarized light component beam emerging from the Wollaston prism 70 are focused on a two-division photodetector 74 by the condenser lens 72, and a regenerative signal is detected from a difference between outputs from the two-division photodetector 74. In this preferred embodiment, the Wollaston prism 70 is rotationally adjusted so that the polarization plane of the beam passed through the phase plate 66 and the optic axis of the Wollaston prism 70 form 45°, so that the generation of offset of a DC component in the regenerative signal can be prevented.

Figure 11A:
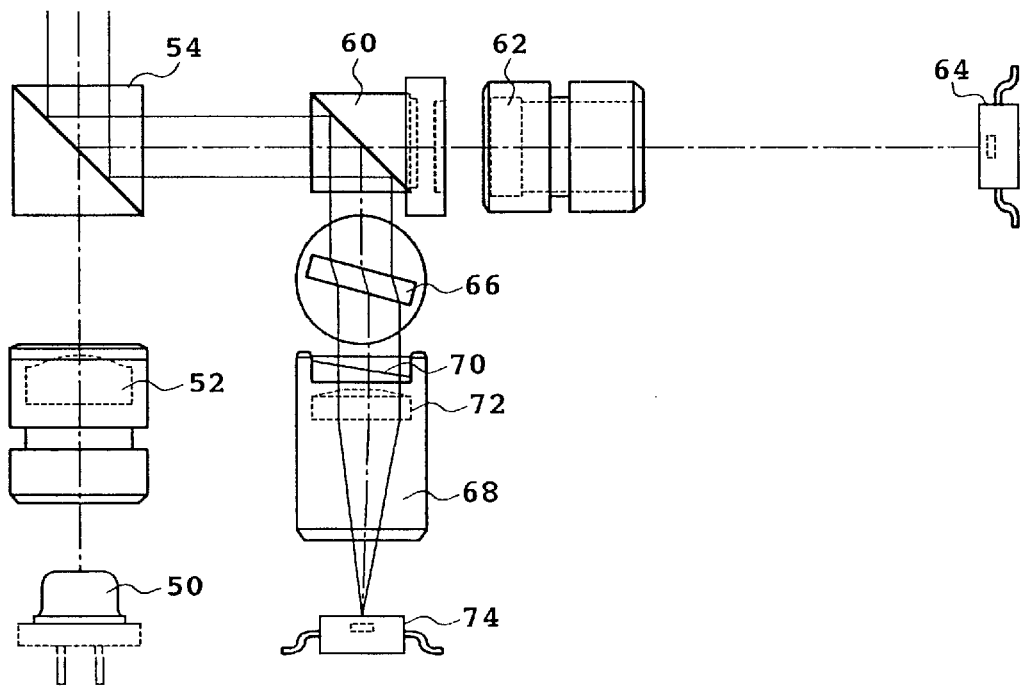
FIG. 11A is a plan view showing the relation between a beam shift amount in the phase plate and an effective diameter of a condenser lens.
Figure 11B:
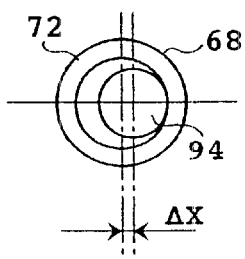
FIG. 11B is an elevational view showing the relation between the condenser lens and a shifted beam.

FIG. 11A is a plan view showing the relation between a beam shift amount in the phase plate 66 and an effective diameter of the condenser lens 72. When the phase plate 66 is rotationally adjusted so as to be tilted with respect to the incident beam prior to fixing, the emergent beam from the phase plate 66 shifts by a given amount from the incident beam as shown in FIG. 11A. To completely compensate for a phase difference when the incidence angle to the phase plate 66 is 0°, the effective diameter of the condenser lens 72 and the effective region of the Wollaston prism 70 are set so as to make allowance for the beam shift amount generated in rotationally adjusting the phase plate 66. As shown in FIG. 11B, the diameter of the condenser lens 72 is determined so that a beam 94 shifted by Δx in the phase plate 66 can pass through the condenser lens 72.

Figure 12:
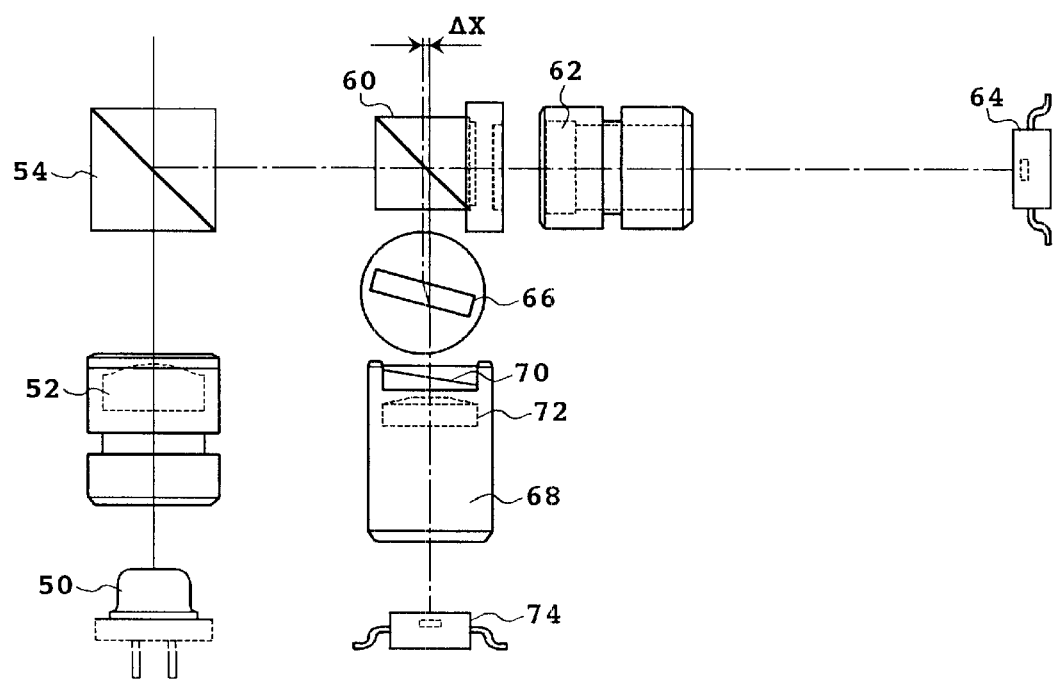
FIG. 12 is a layout of an optical system in the preferred embodiment wherein allowance is made for the beam shift amount in the phase plate.

Referring to FIG. 12, there is shown a layout of the optical system in the preferred embodiment wherein allowance is preliminarily made for the beam shift amount in the phase plate 66. More specifically, the optical system shown in FIG. 12 is configured so that a common optical axis of the Wollaston prism 70, the condenser lens 72, and the photodetector 74 is shifted from the center of the optical path of the incident beam on the phase plate 66 by the beam shift amount Δx considered in rotationally adjusting the phase plate 66 so that the phase difference of the beam passed through the phase plate 66 becomes 0°.

Figure 13:
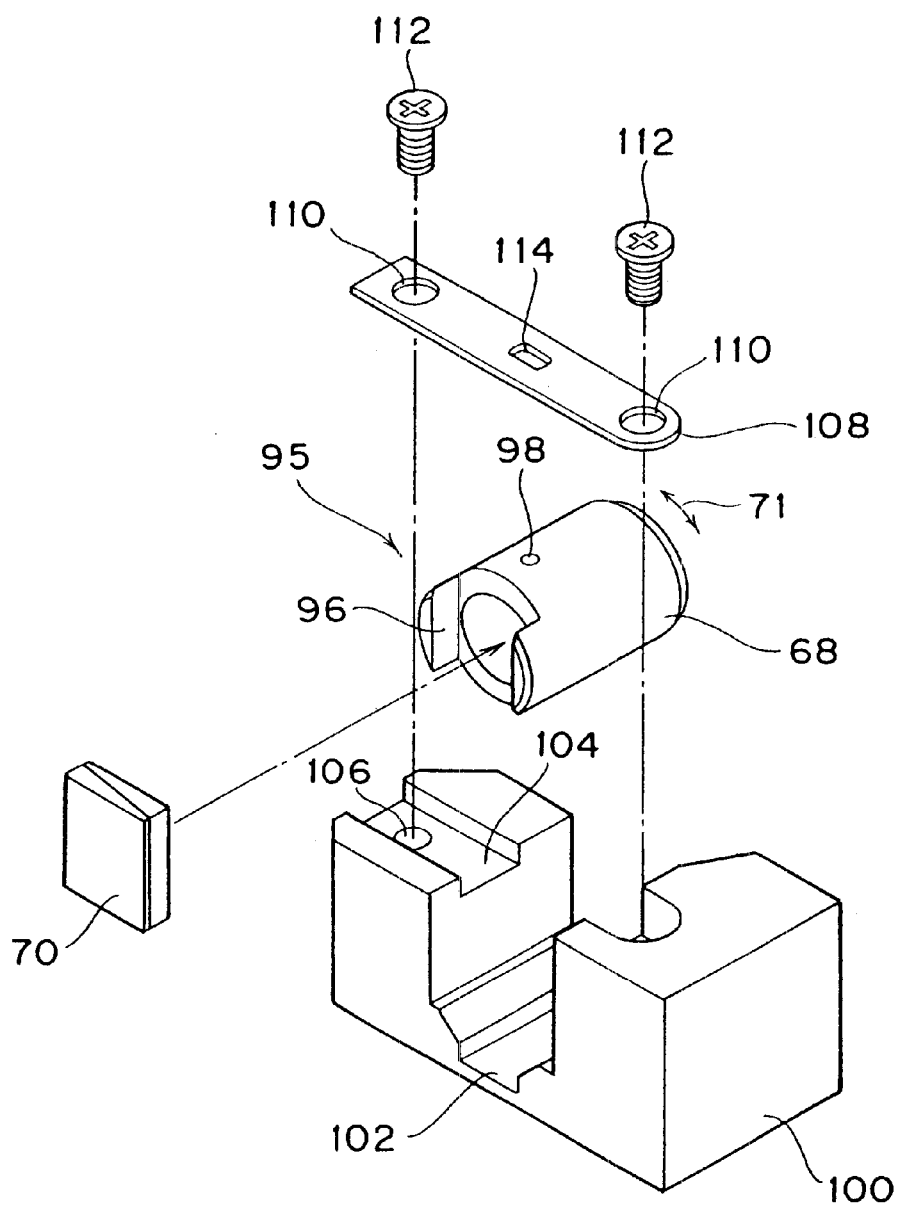
FIG. 13 is an exploded perspective view of a polarization plane rotating mechanism in the preferred embodiment.
Figure 14:
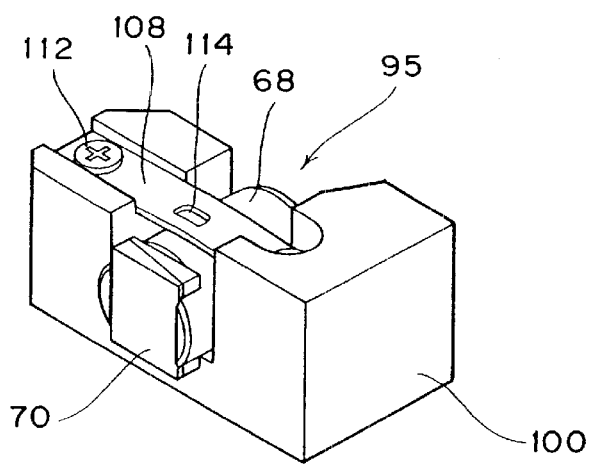
FIG. 14 is a perspective view of the polarization plane rotating mechanism shown in FIG. 13.

FIG. 13 is an exploded perspective view of a polarization plane rotating mechanism 95 in this preferred embodiment, and FIG. 14 is a perspective view of the polarization plane rotating mechanism 95 in its assembled condition. Although not shown in FIGS. 13 and 14, the condenser lens 72 (see FIG. 12) is accommodated in the lens holder 68. A recess 96 is formed at one end of the lens holder 68. The lens holder 68 further has a hole 98. Reference numeral 100 denotes an optical base having a V groove 102, a shallow groove 104 perpendicular to the V groove 102, and a pair of tapped holes 106 (one of which being shown) formed in the shallow groove 104. Reference numeral 108 denotes a leaf spring having a pair of circular through holes 110 formed at opposite end portions and a rectangular through hole 114 formed at a central portion.

The Wollaston prism 70 is fitted with the recess 96 of the lens holder 68 and fixed by adhesion or the like. The lens holder 68 is received in the V groove 102 of the optical base 100, and the leaf spring 108 is fixedly mounted in the shallow groove 104 of the optical base 100 by threading two screws 112 into the tapped holes 106, thereby fixing the lens holder 68 to the optical base 100. In rotationally adjusting the Wollaston prism 70, the screws 112 are slightly loosened and an adjusting pin (not shown) is inserted through the rectangular hole 114 of the leaf spring 108 into the hole 98 of the lens barrel 68. In this condition, the Wollaston prism 70 can be rotated with the lens holder 68 about the optical axis in opposite directions depicted by a double-headed arrow 71 shown in FIG. 13. After rotating the Wollaston prism 70 by an optimum amount with respect to the polarization plane of the incident beam, the screws 112 are tightened to fix the lens holder 68 again. As the beam separating means for separating the beam passed through the phase plate 66 into the P-polarized light component beam and the S-polarized light component beam, a Rochon prism or a Senarmont prism, for example, may be adopted in place of the Wollaston prism 70.

Figure 15:
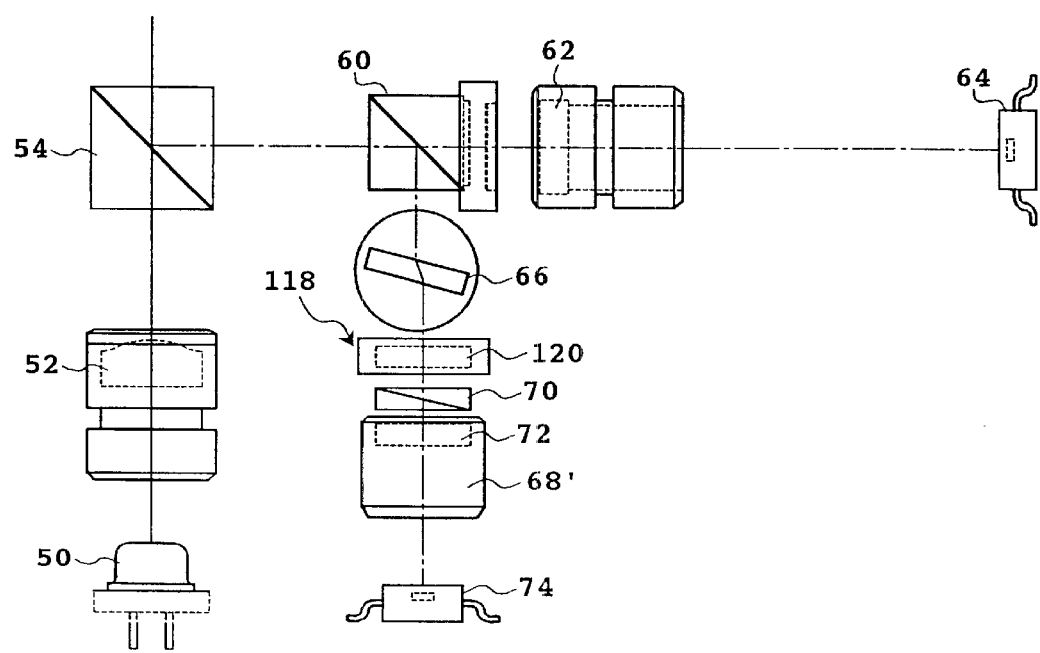
FIG. 15 is a layout of an optical system according to a second preferred embodiment of the present invention.

Referring to FIG. 15, there is shown a layout of an optical system according to a second preferred embodiment of the present invention. This preferred embodiment employs a polarization plane rotating mechanism 118 including a half-wave plate 120 located upstream of the Wollaston prism 70. The half-wave plate 120 is rotatably supported in the polarization plane rotating mechanism 118. The Wollaston prism 70 and a lens holder 68' accommodating the condenser lens 72 are fixed to the drive base 22.

Figure 16:
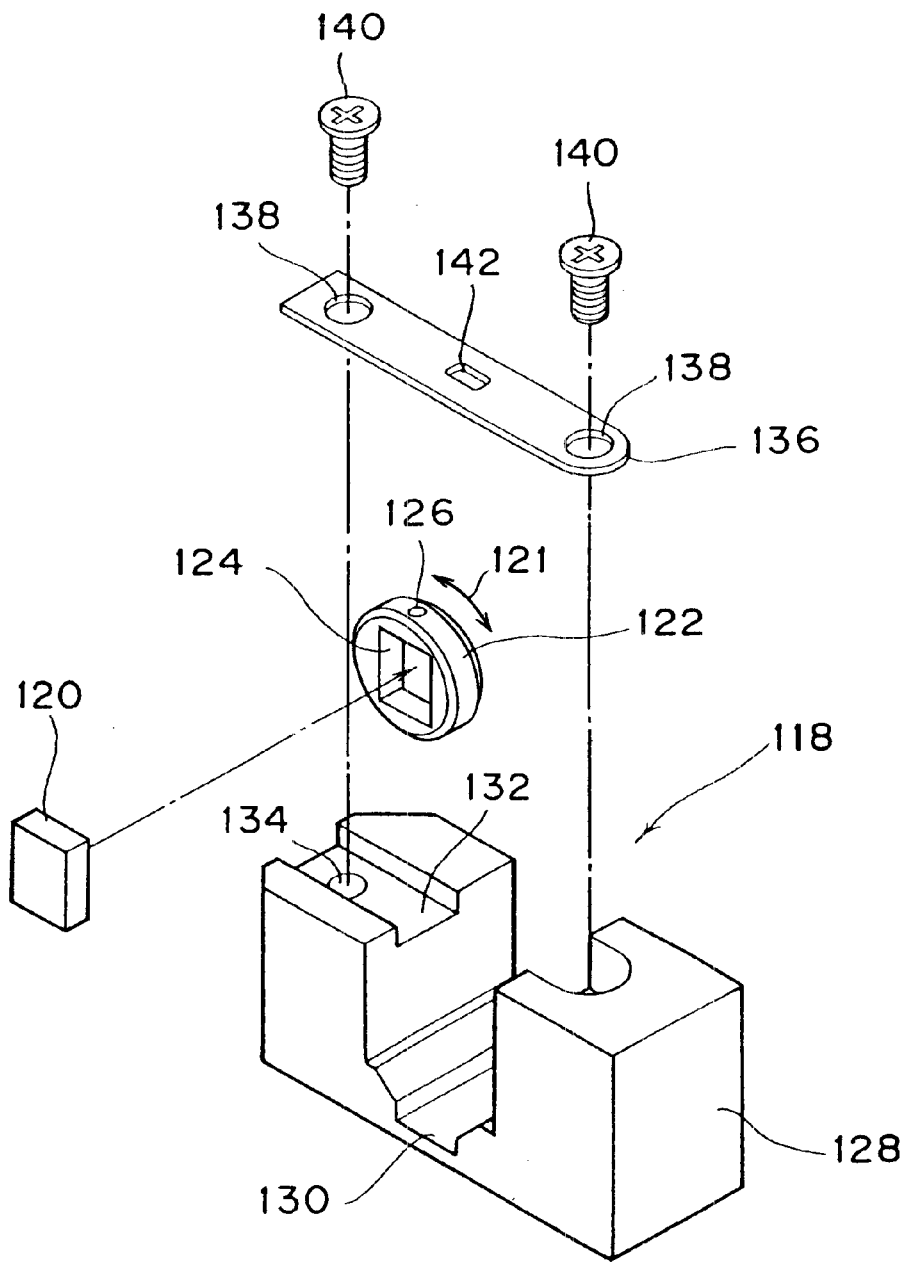
FIG. 16 is an exploded perspective view of a polarization plane rotating mechanism in the second preferred embodiment.
Figure 17:
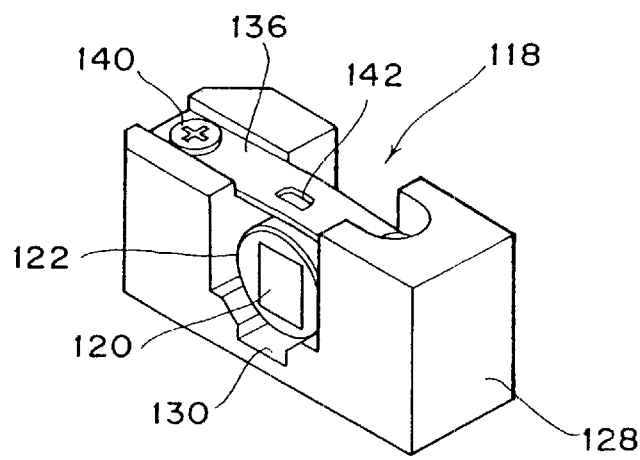
FIG. 17 is a perspective view of the polarization plane rotating mechanism shown in FIG. 16.

FIG. 16 is an exploded perspective view of the polarization plane rotating mechanism 118, and FIG. 17 is a perspective view of the polarization plane rotating mechanism 118 in its assembled condition. Reference numeral 122 denotes a cylindrical support having a rectangular mounting hole 124 and a hole 126. Reference numeral 128 denotes a base having a V groove 130, a shallow groove 132 perpendicular to the V groove 130, and a pair of tapped holes 134 (one of which being shown) formed in the shallow groove 132. Reference numeral 136 denotes a leaf spring having a pair of circular through holes 138 formed at opposite end portions and a rectangular through hole 142 formed at a central portion.

The half-wave plate 120 is fitted with the mounting hole 124 of the cylindrical support 122 and fixed by adhesion or the like. The cylindrical support 122 is received in the V groove 130 of the base 128, and the leaf spring 136 is fixedly mounted in the shallow groove 132 of the base 128 by threading two screws 140 into the tapped holes 134, thereby fixing the cylindrical support 122 to the base 128. In rotationally adjusting the half-wave plate 120, the screws 140 are slightly loosened and an adjusting pin (not shown) is inserted through the rectangular hole 142 of the leaf spring 136 into the hole 126 of the cylindrical support 122. In this condition, the half-wave plate 120 can be rotated with the cylindrical support 122 in opposite directions depicted by a double-headed arrow 121 shown in FIG. 16. After rotating the half-wave plate 120 by an optimum amount, the screws 140 are tightened to fix the cylindrical support 122 again.

Figure 18:
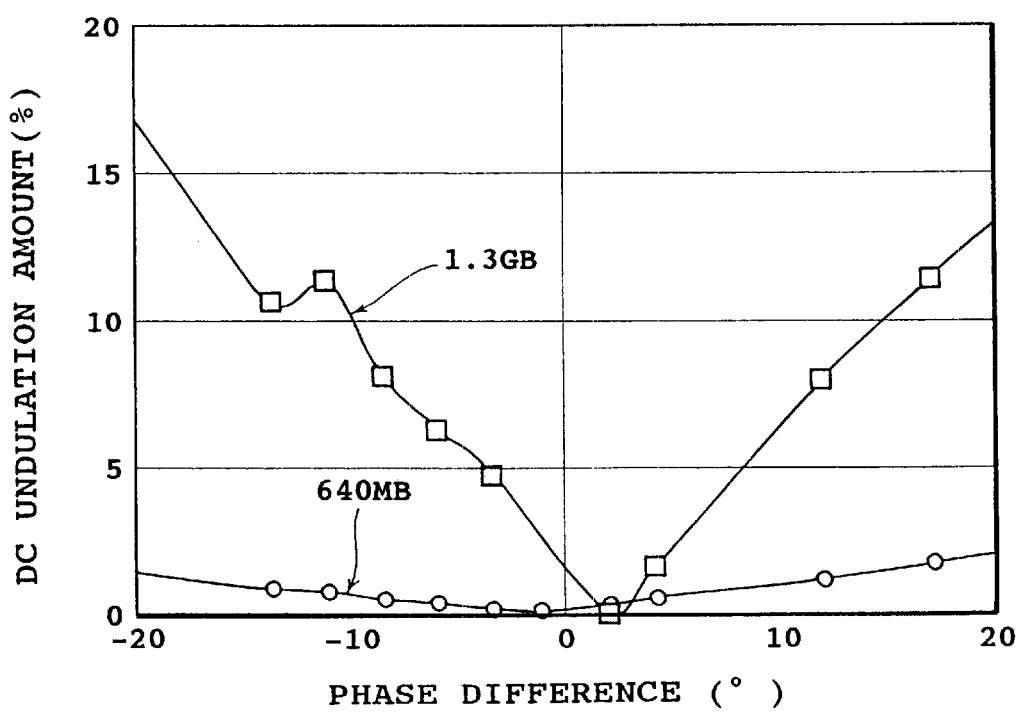
FIG. 18 is a graph showing the relation between a phase difference and a DC undulation amount of a regenerative signal.
Figure 19:
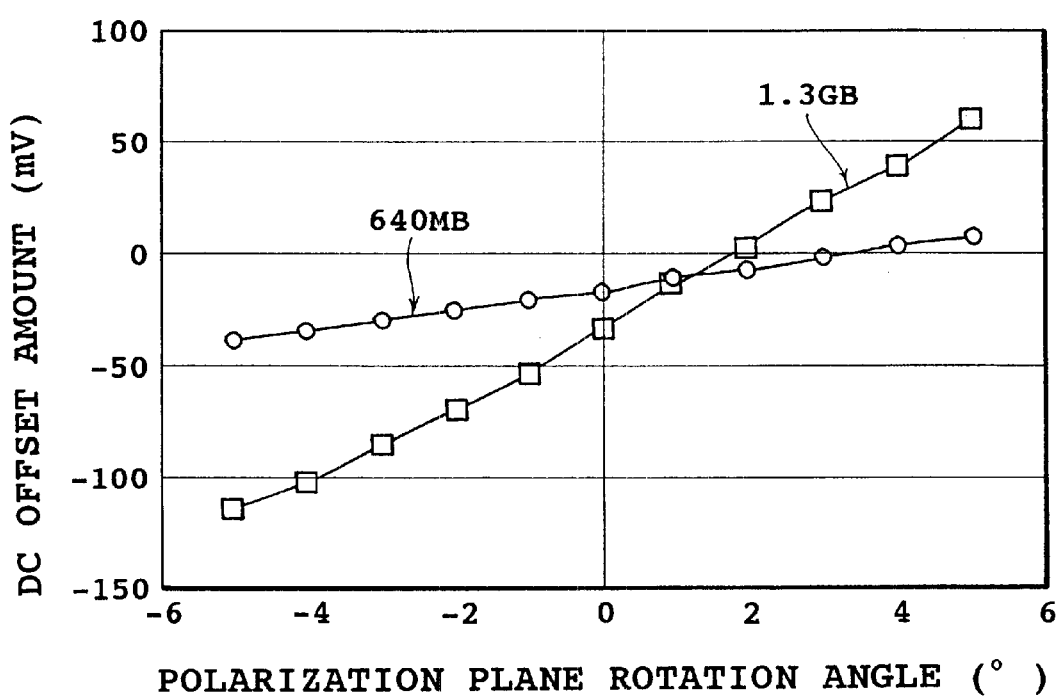
FIG. 19 is a graph showing the relation between a polarization plane rotation angle and a DC offset amount of a regenerative signal.

FIG. 18 is a graph showing the relation between a phase difference and a DC undulation amount in a 640-MB (megabytes) magneto-optical disk drive and in a 1.3-GB (gigabytes) magneto-optical disk drive. As apparent from FIG. 18, a phase difference giving a minimum value of the undulation of a DC component of a regenerative signal is present in each of the 640-MB magneto-optical disk drive and the 1.3-GB magneto-optical disk drive. FIG. 19 is a graph showing the relation between a polarization plane rotation angle and a DC offset amount. As apparent from FIG. 19, the DC offset amount of a regenerative signal can be adjusted to an optimum value by adjusting the polarization plane rotation angle in each of the 640-MB magneto-optical disk drive and the 1.3-GB magneto-optical disk drive.

Having thus described a specific preferred embodiment of the present invention applied to a magneto-optical disk drive, it should be noted that the present invention is not limited to the above preferred embodiment, but may be applied to an optical system in a land/groove recording type magneto-optical disk drive or in an information storage device handling a magneto-optical card/tape.

According to the present invention as described above, the phase difference of the reflected light can be completely compensated in individual storage devices, and the direction of the polarization plane can be optimized in individual storage devices. Accordingly, the undulation and offset of the DC component of a regenerative signal can be reduced to thereby improve the quality of the regenerative signal.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical information storage device comprising:
    an optical source;
    an optical head having an objective lens for focusing light from said optical source onto a recording surface of an optical recording medium;
    a first photodetector for detecting a reproducing signal from reflected light from said optical recording medium;
    a second photodetector for detecting a tracking error signal and a focusing error signal from said reflected light;
    a beam splitter for separating said reflected light into a first beam directed toward said first photodetector and a second beam directed toward said second photodetector;
    a phase compensating mechanism provided between said beam splitter and said first photodetector for compensating for a phase difference of said first beam, said phase compensating mechanism including a phase plate and a support member for supporting said phase plate so that said phase plate is rotationally adjustable about an axis perpendicular to an optical path of said first beam, said phase plate having a thickness such that a phase difference larger than the sum of the maximum values of variations in phase difference in all optical components constituting an optical system through which said reflected light passes is given to said first beam when the angle of incidence of said first beam on said phase plate is 0°;
    beam separating means provided between said phase compensating mechanism and said first photodetector for separating said first beam into two beams having different polarization planes; and
    polarization plane rotating means for rotating a polarization plane of said first beam incident on said beam separating means.

2. An optical information storage device according to claim 1, further comprising:
    a condenser lens for focusing said first beam on said first photodetector;

said beam separating means comprising a Wollaston prism.

3. An optical information storage device according to claim 2, wherein an effective diameter of said condenser lens and an effective region of said Wollaston prism are set so as to make allowance for a shift amount of said first beam generated in rotationally adjusting said phase plate so as to compensate for the phase difference of said first beam.

4. An optical information storage device according to claim 2, wherein said Wollaston prism, said condenser lens, and said first photodetector have a common optical axis shifted from a center of an optical path of said first beam incident on said phase plate by a distance equal to a shift amount of said first beam generated in rotationally adjusting said phase plate so as to compensate for the phase difference of said first beam.

5. An optical information storage device according to claim 2, wherein said polarization plane rotating means comprises:
   a rotatable lens holder for commonly accommodating said condenser lens and said Wollaston prism; and
   an optical base for mounting said lens holder so that said lens holder is rotationally adjustable about the optical axis thereof.

6. An optical information storage device according to claim 2, wherein said polarization plane rotating means comprises means for rotating said Wollaston prism about the optical axis thereof.

7. An optical information storage device according to claim 5, wherein:
   said optical base has a V groove for receiving said lens holder; and
   said polarization plane rotating means further comprises means for fixing said lens holder to said optical base so that said lens holder received in said v groove is rotationally adjustable about the optical axis thereof.

8. An optical information storage device according to claim 1, wherein said polarization plane rotating means comprises:
   a half-wave plate;
   a cylindrical support for accommodating said half-wave plate; and
   means for holding said cylindrical support so that said cylindrical support is rotationally adjustable about the optical axis thereof.

9. An optical information storage device according to claim 1, wherein said phase compensating mechanism is adjusted so as to compensate for the phase difference of said first beam so that an undulation amount of a DC component of said regenerative signal is minimized.

10. An optical information storage device according to claim 9, wherein said polarization plane rotating means is adjusted so as to rotate the polarization plane of said first beam so that an offset amount of the DC component of said regenerative signal is minimized.

11. An optical system for an optical information storage device, comprising:
   an optical source;
   an optical head having an objective lens for focusing light from said optical source onto a recording surface of an optical recording medium;
   a first photodetector for detecting a reproducing signal from reflected light from said optical recording medium;
   a second photodetector for detecting a tracking error signal and a focusing error signal from said reflected light;
   a beam splitter for separating said reflected light into a first beam directed toward said first photodetector and a second beam directed toward said second photodetector;
   a phase compensating mechanism provided between said beam splitter and said first photodetector for compensating for a phase difference of said first beam, said phase compensating mechanism including a phase plate and a support member for supporting said phase plate so that said phase plate is rotationally adjustable about an axis perpendicular to an optical path of said first beam, said phase plate having a thickness such that a phase difference larger than the sum of the maximum values of variations in phase difference in all optical components constituting an optical system through which said reflected light passes is given to said first beam when the angle of incidence of said first beam on said phase plate is 0°;
   beam separating means provided between said phase compensating mechanism and said first photodetector for separating said first beam into two beams having different polarization planes; and
   polarization plane rotating means for rotating a polarization plane of said first beam incident on said beam separating means.

12. An optical information storage device comprising:
   an optical source;
   an optical head having an objective lens for focusing light from said optical source onto a recording surface of an optical recording medium;
   a first photodetector for detecting a reproducing signal from reflected light from said optical recording medium;
   a second photodetector for detecting a tracking error signal and a focusing error signal from said reflected light;
   a beam splitter for separating said reflected light into a first beam directed toward said first photodetector and a second beam directed toward said second photodetector;
   a phase compensating mechanism provided between said beam splitter and said first photodetector for compensating for a phase difference of said first beam;
   a Wollaston prism provided between said phase compensating mechanism and said first photodetector for separating said first beam into two beams having different polarization planes;
   polarization plane rotating means for rotating a polarization plane of said first beam incident on said beam separating means; and
   a condenser lens for focusing said first beam on said first photodetector;
   wherein said phase compensating mechanism includes a phase plate and a support member for supporting said phase plate so that said phase plate is rotationally adjustable about an axis perpendicular to an optical path of said first beam, and
   wherein said Wollaston prism, said condenser lens, and said first photodetector have a common optical axis shifted from a center of an optical path of said first beam incident on said phase plate by a distance equal to a shift amount of said first beam generated in rotationally adjusting said phase plate so as to compensate for the phase difference of said first beam.

* * * * *